April 8, 1952     H. D. WILSON ET AL     2,591,755
STORAGE BATTERY SEPARATOR
Filed July 9, 1945
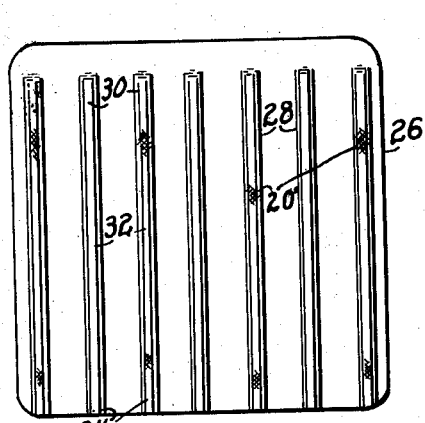
Fig. 1
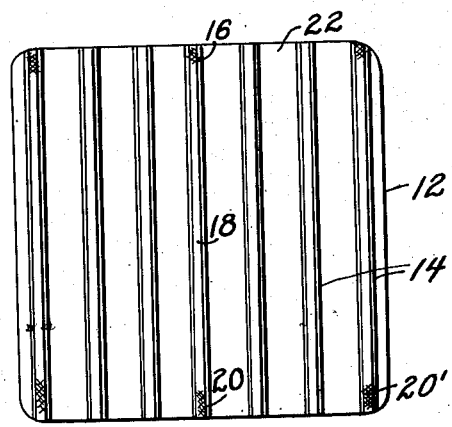
Fig. 6
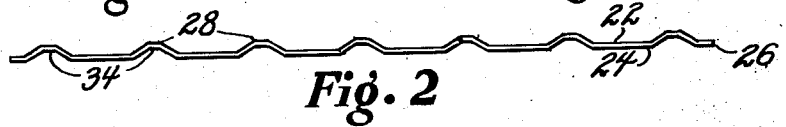
Fig. 2
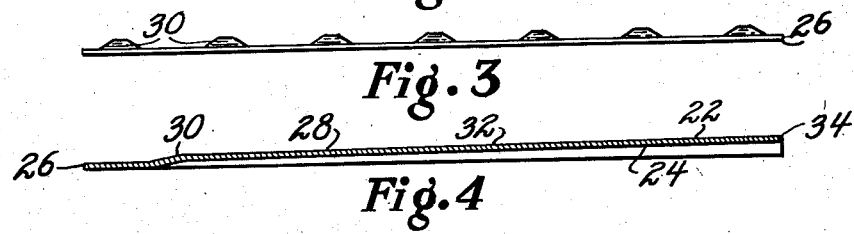
Fig. 3
Fig. 4
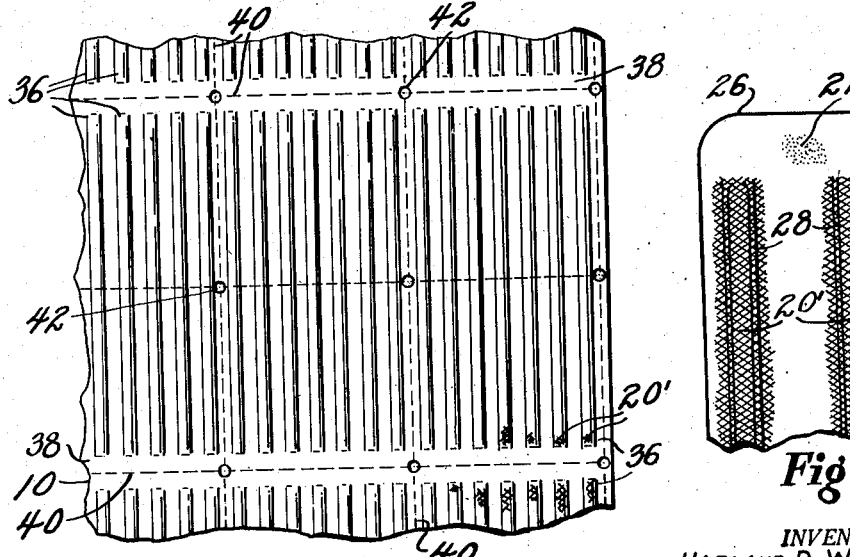
Fig. 5
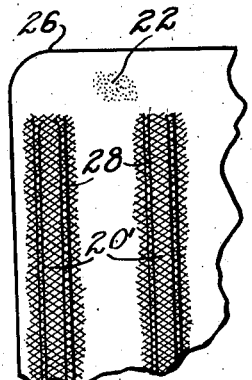
Fig. 7
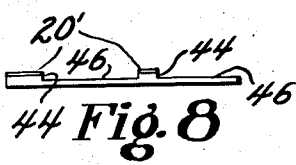
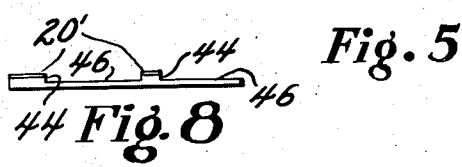
Fig. 8
INVENTORS
HARLAND D. WILSON
CHARLES POPPER
BY
ATTORNEYS Patented Apr. 8, 1952

2,591,755

UNITED STATES PATENT OFFICE 2,591,755

STORAGE BATTERY SEPARATOR

Harland D. Wilson and Charles Popper, Toledo, Ohio, assignors to Auto-Lite Battery Corporation, Niagara Falls, N. Y., a corporation of New York Application July 9, 1945, Serial No. 603,832

11 Claims. (Cl. 136—145)

This invention relates to battery separators, more particularly to synthetic separators made of polymerized organic chemical fibers, granules or mixtures thereof or natural fibers bonded together with resins, as for example, a polymerized synthetic resin.

The invention contemplates the production of a synthetic separator which is durable, cheap to manufacture in quantities of exact predetermined gauge and dimensions, easy to handle and assemble by stuffing into a battery plate group, and being fabricated of raw materials, readily available on the market in uniform and purified form. The separator disclosed has particular utility in a charged and dry storage battery, in dry, sealed condition, is shipped separately from the electrolyte, which is added to the battery at the point of destination to place the battery in operative form. In this application, the utilization of a chemical wetting agent is contemplated in the separator, applied either to the separator directly, and thereafter dried, or added as a component part of the electrolyte at a point of destination.

It is, therefore, an object of this invention to provide a synthetic separator, more particularly for use in a lead-acid type of storage battery.

It is a further object of this invention to provide for use in a storage battery of the lead-acid type, a separator which is made of natural or synthetic fibers or granules bonded together.

Another object of this invention is to provide a separator for batteries of the lead-acid type incorporating or treated with a wetting agent.

Still another object of this invention is to provide a separator for storage batteries which can be used to produce a cell pack which can be snugly fitted into a cell without the necessity of employing shims or blocks of various sizes.

An additional object of this invention is to provide a separator for storage batteries which is reinforced to substantially strengthen the separator without materially reducing the circulation of the electrolyte.

Another object of this invention is to produce a separator for storage batteries having an increased life yet of a less gauge and greater flexibility than those now commonly employed, thereby permitting the use of a greater volume of electrolyte in a cell of a given size and offering less resistance to the circulation thereof, with the resultant increase in efficiency in battery construction and performance.

Still another object of this invention is to produce a separator having an overall thickness at least as great or greater than the space between the plates in which it is to be placed.

This application is an improvement on application of United States Letters Patent Serial No. 594,922, filed May 21, 1945, by the co-inventor, Harland D. Wilson and one Jean H. Quick for Battery Separators.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a plan view of one form of the separator;

Fig. 2 is an end view of the separator looking from the bottom of Fig. 1;

Fig. 3 is a view of the opposite or top end of the separator of Fig. 1;

Fig. 4 is a longitudinal sectional view, through a rib of the separator of Fig. 1, the taper of the rib being somewhat exaggerated;

Fig. 5 is a plan view of a section of a web from which a multiple of the separators embodying the invention are simultaneously formed;

Fig. 6 is a view, similar to Fig. 1, the separator embodying a modified rib design;

Fig. 7 is a fragmentary view of a separator showing the ribs reinforced by a plastic impregnation; and Fig. 8 is a partial end view of an additional modification of separator construction also embodying features of the invention herein.

The separator for lead-acid types of storage batteries contemplated in this invention may be made of natural fibers bonded together by a resin, or of synthetic fibers or granules, either bonded together by a resin or by being self-bonded. In a preferred modification of the invention, the separator is fabricated from purified cellulose fibers obtained from wood, such as alpha pulp and/or bleached kraft pulp of western hemlock. However, other organic fibers may be used or synthetic fibers as nylon, or the like, granular resins or glass. The base material is formed into a thin sheet, for example, in a paper-making machine, with a predetermined density and porosity. Inasmuch as density largely controls porosity, it has been found that a density from 6.5 to 9.5 grams per cubic inch is satisfactory.

When the fibers are formed into a thin sheet having the desired density and porosity, the sheet is impregnated such as by immersion or loaded with a resin capable of permanently bonding the body forming materials together to form a durable web or sheet which will have the necessary physical and chemical properties to fulfill its function as a battery separator. A resin preferred for this purpose is a water-dispersed thermosetting phenol-formaldehyde resin, although a thermoplastic resin may also be used. A suitable resin and a method of making such is disclosed in the Handbook of Plastics by Herbert R. Simonds and Carleton Ellis (third printing) pages 476 to 478 inclusive, published by D. Van Nostrand Company, Inc. The amount of resin used may vary widely as from 15 to 65 per cent by weight of the completed separator, the preferred amount being in the range of 25 to 40 per cent of the weight of the dry separator.

After impregnation, the sheet is dried to remove all but a small per cent of the water (or other solvent or carrier) and to prepare the resin bond in the sheet for polymerization.

The thin sheet or web 10 of matted fibers impregnated with the uncured or unpolymerized resin may then be fed into an embossing or corrugating apparatus (such as employed in the paper industry) and predesigned rollers or pressure dies may determine a pattern suitable for the purpose of facilitating circulation of the electrolyte in and escape of gases from the completed battery in which the separator is used. Prior to embossing, the sheets of matted fiber may be treated so that the moisture content is brought up to a value which will enable the sheets to be embossed without tearing, that is from around five per cent to about 17 per cent.

In a continuous production schedule, the web 10 can be directly delivered from a paper-making machine in which a moisture or water content control is utilized, to the embossing apparatus. However, if the stock had been in storage or transit, during which time the moisture content had become too low for satisfactory embossing, the stock may be allowed to soak, treated with steam and pressure, or otherwise acted upon so the desired moisture content is of a magnitude that the fibers are lubricated and slide over one another during the shaping operation and the sheet does not tear or break while a uniform thickness and density is maintained throughout the entire web.

Various forms of embossing and additional separator treatments with resultant advantages may now be more fully described.

Referring to Fig. 6, a more simple type of embossing is illustrated wherein the finished separator 12 is provided with a series of uniform cross-sectional ribs 14 transversely extending across the entire length of the sheet. In the production of this type, the embossing rolls form continuous ribs along the web and the separators are cut therefrom to desired dimensions.

The ribs 14 may be of any desired cross-sectional contour, such as a frustum herein shown, or may be arcuate, triangular or other pattern.

The ribs 14 may also be tapered in height from one end to the other. For example, the end 16, which will be at the upper edge of the separator in an assembled plate pack, may have an overall height (the mensuration between one side of the stock to the outer side of the rib on the opposite side) of approximately .086" when a sheet is employed having an average overall thickness of about .032". The median portion 18 would then desirably be about .098" overall height while the other end 20 would be in the neighborhood of .103". These figures are given as but a single example found satisfactory in a battery subject to the particular condition met in service by such a device. In another instance the use of a constant height rib, .077 or greater overall height when isolated has proven satisfactory when used between battery plates where the available space is .077". The stuffing of such a separator between the plates thereby requires a slight compression and, in turn, the separator is held under this compression firmly in place and avoids the use of any shims.

The use of the tapered rib has certain additional advantages, especially in the assembly of a plate pack. When the separators are stuffed between the alternate positive and negative plates, the pack is given a slight flare at its lower end which may be of a width slightly in excess of the space provided for the element in the cell into which it is to be placed. The nature of these separators permit compression of the plate pack at its lower end, so that it may be readily inserted into the cell and the inherent springiness of such a group of separators causes the pack to firmly nest within the cell, thereby eliminating the use of any shims, a highly desirable feature.

In the production of the sheet material herein described, such is formed on a wire screen whereby one side 22 thereof is given a slightly meshed, stippled or dimpled finish, while the other side 24 is comparatively smooth. Due to the method of impregnation with resin such as by immersion there is a slightly higher concentration or content of the coating of the resin along the meshed side. Therefore, the ribs embossed thereon are formed to extend outwardly from this rougher side and are placed in contact with the positive plates in a plate pack. The resin contact retards the oxidation of the separators in proportion to the higher percentage present, and, as such oxidation originates with the positive plates, the rate of oxidation is decreased by increasing the proportion of the resin content in the separator regions adjacent to or contacting such plates.

There may also be a differential of resin content disposed at predetermined portions of one side of the separators. For example, the ribs 14 may be provided with additional resin 20' therealong. Such may be applied as a coating over all or a partial width thereof, either at the time of embossing, immediately thereafter before further separator curing as described hereinafter, or even after curing and storage. The extra resin might even be added to the sheet stock at locations which will become ribs or other selected places. A portion of the additionally applied resin is, by the nature of the separator body, absorbed to reinforce or increase the resin content of the separators along the ribs. This is most desirable to those portions which later will contact the positive plates. This increased resin content also serves to improve the overall separator stability without materially decreasing its flexibility nor unduly build up separator resistance against electrolyte circulation.

The increased or supplemental resin application may be along all the ribs and applied to either side of the separator, or only a portion of the rib may be so treated. For example, the alternate ribs, the two exterior ribs or any predetermined set thereof may be selectively treated. Such treatment may also be given the separator over any desired region. While the supplemental resin may slightly increase separator resistance, such distribution can be controlled to hold such resistance to a minimum.

Resins are desirable both from a practical as well as economical basis. However, other chemicals may be employed such as silicates as for examples, sodium silicate or ethyl silicate.

A highly desirable separator 26 may also be obtained by forming tapered ribs 28 which extend short of the entire distance laterally across the separator (Fig. 1). The rib may start at a distance spaced from one edge of the separator 26 (such edge to be assembled as the top thereof in a plate pack), at which region 30 the overall thickness, for example, being .082", the medium 32 being about .087" with the open end 34 approximately .092". Here again a predetermined selection of the ribs 28 may be provided with an increased concentration of resin 20'.

A means of web handling for embossing thereof and indicating accurate cutting lines is diagrammatically shown in Fig. 5. Series of longitudinal sets of parallel, arched ribs 36 are embossed on the web 10, each rib 36 being twice the length of a rib 28 in a completed separator and the series having spacing 38 therebetween twice the distance from the separator edge to the rib termini. At the intersections of the predetermined cutting lines 40, indexing means 42 may be fixed by the embossing rolls such as raised dots or holes which, in turn, serve as means to control a cutting machine. Each set of ribs 36, when centrally cut, form a pair of separator blanks having their lower edges abutting. The indexing serves to indicate exact cutting intersections for the production of a multiple of like dimension separators.

The sheet or the cut blanks can be given additional treatment. For example, a moist sheet or the blanks are placed in a temperature of 325°–375° F. for a period of time sufficient to evaporate excess moisture and polymerize or thermoset the resin. This curing of the impregnated and/or regional concentrated impregnated material renders the sheet or blanks relatively rigid and gives it permanent form. Curing can be effected at temperatures lower or higher than the above specified temperature range according to the materials employed and the results desired.

Hereinbefore embossed forms have been described but the invention includes separators having other physical forms as, for example, shown in Fig. 8. Following the curing step, the sheet is subjected to a high speed grinding operation or the like, so that ribs 44 may be formed by cutting grooves 46 in one face of the sheet stock. The grinding reduces the thickness in the grooves 46, leaving the ribs 44, the original thickness of the sheet. The ribs may then be coated with additional resin 20' and again cured if the resin employed requires it or the resin in the body may be supplemented by an additional coating and the stock subjected to a single curing operation.

While any design of embossing may be used, ribbed or straight patterns open at least on one side of the separator are preferred. This facilitates stacking and separating from a stack by a battery assembler.

The cured separators may be further treated for having their affinity for liquids increased, hence increasing the efficiency. To this end they are subjected to a chemical wetting agent, preferably an organic chemical compound, with the result the separators are more quickly and completely saturated with the electrolyte to reduce the internal resistance of the battery to a minimum, so that the most efficient operation of the battery is obtained. The wetting agent is innocuous as far as the chemical action of the battery is concerned and does not affect the normal cycle of the storage battery.

Many wetting agents are known and are commercially available but dioctyl sodium sulfosuccinate, commercially known as Aerosol OT, is preferred, being preferably introduced into the separator in a water solution. However, it may also be introduced by an organic solvent, such as benzene or alcohol, in which this wetting agent is soluble. It may also be introduced by a liquid medium as a colloidal dispersion of the wetting agent. The liquid medium is then removed by evaporation, depositing the wetting agent on the fibers of the separator. The strength of the preferred water solution of the wetting agent is ¼ to 3 per cent by weight. When the electrolyte is added to a charged and dry battery, the wetting agent, being present in the separator, will cause a rapid dispersion of the electrolyte through the separator whereby the internal resistance of the battery is reduced to a minimum to assure efficient operation of the battery.

Instead of impregnating the sheet with phenolic resin, drying the sheet, curing the resin and applying a water solution of wetting agent to the cured sheet as a second step, it has been found possible to combine the water dispersed resin and the wetting agent so that one saturation of the sheet and one drying and curing operation serves to polymerize the resin and impregnate the sheet with the wetting agent so that the separators made from the sheet are promptly wetted with sulfuric acid electrolyte when it is added to a charged and dry battery. The added distributed resin may also be applied before this operation, so that but a single curing is necessary in the production of the completed separator.

In a modification of the invention, the separator is fabricated from synthetic fibers of vinyl resin, such as a copolymer of vinyl chloride and vinyl acetate. The resin is first dissolved in an organic solvent and spun into a fiber which is "set" by heating under tension, the fibers being preferably from 10 to 25 microns in diameter. These fibers are then formed into a felted mat under heat and pressure to the desired thickness. This resin is thermoplastic and a temperature and pressure are used until a softening occurs to bond the fibers to each other to form a sheet of desired porosity. For fibers having a diameter from 20 to 25 microns, a density from 7 to 9 grams per cubic inch will give the preferred porosity. Glass fibers may also be employed, solely or in combination with other natural or synthetic fibers.

The self-bonded sheets are then given the desired physical form as shown in the figures of the drawing in any convenient manner, and then treated by immersion, if desired, with a water solution containing approximately ¼ to 3 per cent of a wetting agent such as dioctyl sodium sulfosuccinate described hereinbefore. The alternative, above described, for treating the separator with the wetting agent is also applicable to this modification. This modified separator of synthetic vinyl resin fibers also does not have the necessary affinity for the electrolyte so that treatment with the wetting agent is desirable for charged and dry batteries. The solvent for the wetting agent is again removed by evaporation.

The wetting agent may also be added to the battery cell in other ways to facilitate the saturation of these separators by the electrolyte, as set forth in the above disclosure as, for example, by mixing it with the electrolyte added to a charged and dry battery, the amount added to the electrolyte being in approximately the same proportion as set forth above. When the wetting agent is added in this manner, obviously the step in which the separator is treated with the wetting agent is omitted.

It is to be understood that the above detailed description of the present invention is intended to disclose an embodiment thereof to those skilled in the art, but that the invention is not to be construed as limited in is application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed and it is desired to secure by United States Letters Patent is:

1. The method of producing a synthetic battery separator, including forming fibers into a porous sheet having an average thickness of .032 inches and a density of from 6.5 to 9.5 grams per cubic inch, impregnating the sheet with a phenol formaldehyde water-dispersed resin, partially drying the sheet, forming ribs on said impregnated sheet, applying additional resin to the upper surface of the ribs, and polymerizing the resin by the application of heat to form a relatively rigid sheet.

2. The method of producing a synthetic separator for an electrolytic battery, including forming alpha-cellulose fibers into a sheet having an average thickness of .032 inches and a density of from 6.5 to 9.5 grams per cubic inch, impregnating the sheet with 15 to 65 per cent based on the weight of the dry separator with a water-dispersed phenol formaldehyde resin, partially drying the sheet, forming spaced ribs on said impregnated sheet, applying additional resin to the upper surface of the ribs, applying heat to the impregnated sheet to polymerize the resin and treating the polymerized sheet to increase dispersion of the electrolyte therethrough.

3. A battery separator comprising an embossed fiber sheet impregnated with a resin to act as a binder, said embossed portion including at least one continuously tapered rib extending across the sheet to provide varying transverse thickness of the separator with the largest transverse dimension at the bottom of the separator respective to its position in a battery.

4. The method of producing a synthetic battery separator including forming fibers into a porous sheet having suitable thickness and density, impregnating the sheet with a phenol formaldehyde water-dispersed resin, partially drying the sheet, forming ribs on said impregnated sheet, applying additional resin to the upper surface of the ribs and polymerizing the resin by the application of heat to form a relatively rigid sheet.

5. The method of producing a synthetic separator for an electrolytic battery including forming cellulose fibers into a sheet having suitable thickness and density, impregnating the sheet with 15 to 65 per cent based on the weight of the dry separator with a water-dispersed phenol formaldehyde resin, partially drying the sheet, forming spaced ribs on said impregnated sheet, applying additional resin to the upper surface of the ribs, applying heat to the impregnated sheet to polymerize the resin, and treating the polymerized sheet to increase dispersion of the electrolyte therethrough.

6. The method of producing a synthetic battery separator including forming fibers into a porous sheet having suitable thickness and density, impregnating the sheet with a phenol formaldehyde water-dispersed resin from 15 to 65 per cent based on the weight of the dry separator, partially drying the sheet, forming ribs on said impregnated sheet, applying additional resin to the upper surface of the ribs and polymerizing the resin by the application of heat to form a relatively rigid sheet.

7. The method of producing a synthetic battery separator including forming cellulosic fibers into a porous sheet having suitable thickness and density, impregnating the sheet with a phenol formaldehyde water-dispersed resin from 15 to 65 per cent based on the weight of the dry separator, partially drying the sheet, forming continuously tapered ribs on said impregnated sheet with the largest thickness dimension adjacent the bottom, polymerizing the sheet by the application of heat to form a relatively rigid sheet, applying additional resin to the upper surface of the ribs, and polymerizing the additional resin on the ribs by a second application of heat.

8. The method of producing a synthetic separator for an electrolytic battery including forming cellulose fibers into a sheet having suitable thickness and density, impregnating the sheet with 15 to 65 per cent of a water-dispersed phenol formaldehyde resin based on the weight of the dry separator, partially drying the sheet, forming spaced continuously tapering ribs vertically on said impregnated sheet with the largest thickness dimension adjacent the bottom, applying additional resin to the upper surface of the ribs, applying heat to the impregnated sheet to polymerize the resin, and treating the polymerized sheet to increase dispersion of the electrolyte therethrough.

9. The method of producing a synthetic separator for an electrolytic battery including forming cellulose fibers into a sheet having suitable thickness and density, impregnating the sheet with 15 to 65 per cent of a water-dispersed phenol formaldehyde resin based on the weight of the dry separator, partially drying the sheet, forming spaced continuously tapering vertical ribs on said impregnated sheet, applying heat to polymerize the resin to form a relatively rigid sheet, applying additional resin to the upper surface of the ribs, applying heat to the relatively rigid sheet to polymerize the second application of resin, and treating the polymerized sheet to increase dispersion of the electrolyte therethrough.

10. A dry synthetic battery separator comprising an embossed porous sheet of cellulosic fibers bonded by a thermosetting resin of the phenol formaldehyde type, said sheet being of suitable thickness and bonded by resin in the amount of 15 to 65 per cent by weight of the dry separator without substantially changing the porosity of the sheet and having a density not greater than 9.5 grams per cubic inch exclusive of the bonding resin, said embossed portion of the sheet being uniformly tapered in thickness from top to bottom with the largest thickness dimension adjacent the bottom of the separator as mounted in a battery.

11. A dry synthetic battery separator for use in an electrolytic battery comprising a porous sheet of cellulosic fibers bonded by a thermo-setting resin of the phenol formaldehyde type with a wetting agent uniformly deposited on the fibers to increase dispersion of the electrolyte therethrough, vertical spaced embossments on said sheet, said sheet being of suitable thickness and bonded by resin in the amount of 15 to 65 per cent of weight of the dry separator without substantially changing the porosity of the sheet and having a density not greater than 9.5 grams per cubic inch exclusive of the bonding resin and wetting agent, said embossed portion of the sheet being uniformly tapered in thickness from top to bottom with the largest thickness dimension adjacent the bottom of the separator as mounted in a battery.

HARLAND D. WILSON.
CHARLES POPPER.

REFERENCES CITED

The following references are of record in the file of this patent:

UNITED STATES PATENTS

| Number | Name | Date |
| --- | --- | --- |
| 342,378 | Nenninger | May 25, 1886 |
| 1,218,967 | Willard | Mar. 13, 1917 |
| 1,343,708 | Chamberlain | June 15, 1920 |
| 1,357,378 | Boyer | Nov. 2, 1920 |
| 1,366,223 | Wales | Jan. 18, 1921 |
| 1,484,927 | Benner | Feb. 26, 1924 |
| 1,744,256 | Benner | Jan. 21, 1930 |
| 1,898,601 | Shoemaker | Feb. 21, 1933 |
| 1,948,314 | Pratt et al. | Feb. 20, 1934 |
| 2,084,272 | Auchterlonie | June 15, 1937 |
| 2,175,798 | Hauser | Oct. 10, 1939 |
| 2,190,672 | Meharg | Feb. 20, 1940 |
| 2,195,134 | Rasch | Mar. 26, 1940 |
| 2,306,781 | Francis | Dec. 29, 1942 |
| 2,314,203 | Fairclough | Mar. 16, 1943 |
| 2,382,829 | Strickhouser et al. | Aug. 14, 1945 |
| 2,414,177 | Smith | Jan. 14, 1947 |
| 2,428,470 | Powers | Oct. 7, 1947 |
| 2,457,160 | Kurtz et al. | Dec. 28, 1948 |
| 2,465,493 | Strickhouser et al. | Mar. 29, 1949 |
| 2,531,504 | Dillehay et al. | Nov. 28, 1950 |